April 20, 1926.                L. G. CASE                1,581,919
                        TOOL SHARPENING DEVICE
                    Filed April 10, 1924        3 Sheets-Sheet 1

Inventor:
L. G. Case,
By Hazard and Miller
Attorneys

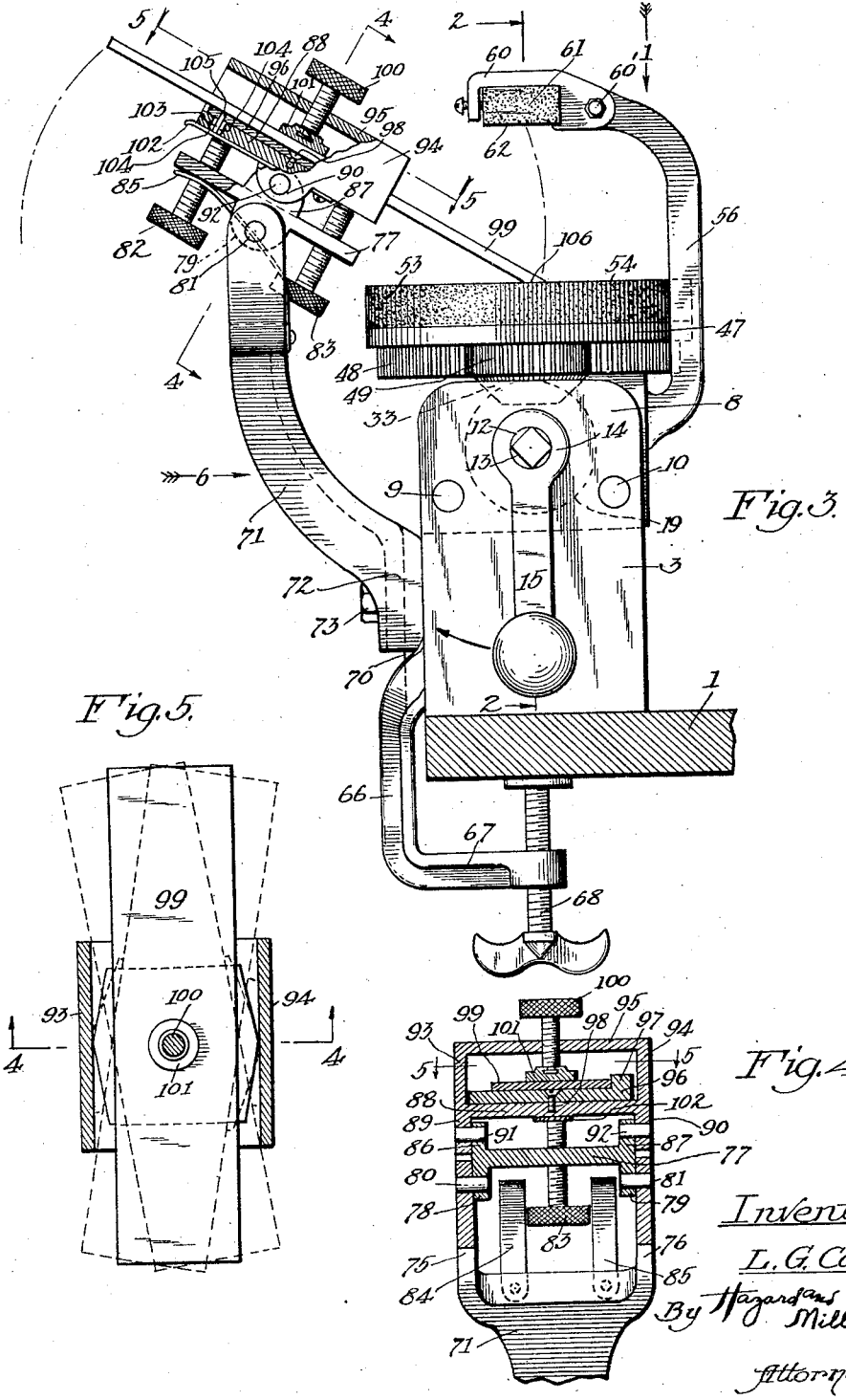

April 20, 1926.
L. G. CASE
TOOL SHARPENING DEVICE
Filed April 10, 1924
1,581,919
3 Sheets-Sheet 3
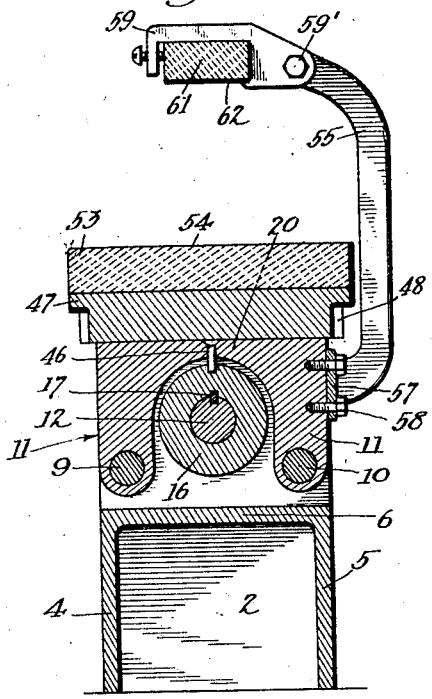
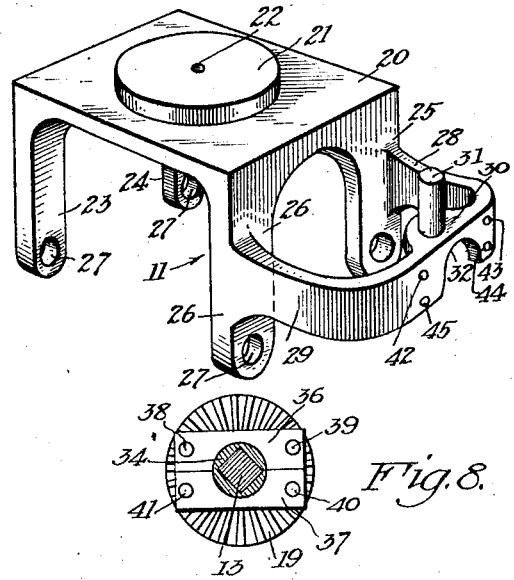
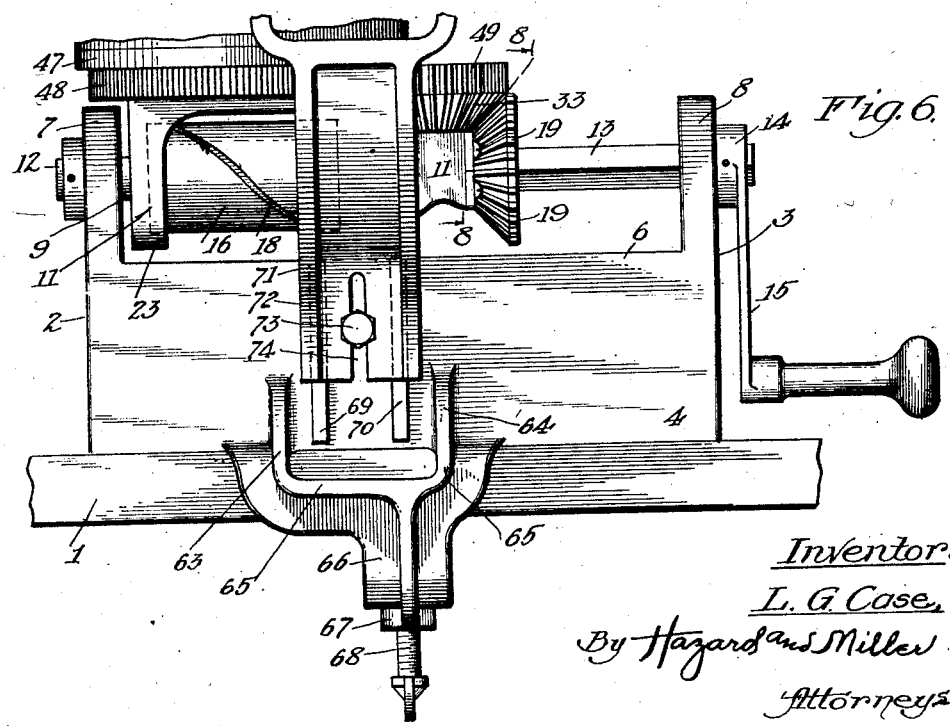
Inventor:
L. G. Case,
By Hazard and Miller
Attorneys Patented Apr. 20, 1926.

1,581,919

UNITED STATES PATENT OFFICE.

LEON G. CASE, OF EAGLE ROCK, CALIFORNIA.

TOOL-SHARPENING DEVICE.

Application filed April 10, 1924. Serial No. 705,540.

*To all whom it may concern:*

Be it known that I, LEON G. CASE, a citizen of the United States, residing at Eagle Rock, in the county of Los Angeles and State of California, have invented new and useful Improvements in Tool-Sharpening Devices, of which the following is a specification.

My invention relates to tool sharpening devices and consists of the novel features herein shown, described and claimed.

An object of my invention is to make a tool sharpening device having a flat rotating grinding face mounted to reciprocate in a plane at right angles to its axis of rotation.

Another object of my invention is to mount a rotating reciprocating grinding element in opposed relation to a reciprocating grinding element.

Another object is to mount an adjustable tool holder in position to support a tool for engagement with a rotating reciprocating face grinder and a reciprocating grinder, so that a tool may be operated to engage first one grinder and then the other.

Other objects and advantages will appear from the drawings and specifications.

The drawings illustrate the invention.

Fig. 3 is an end elevation looking in the direction indicated by the arrows 3 in Figs. 1 and 2, and showing the device clamped upon a table, parts being broken away and shown in section.

Fig. 4 is a cross sectional detail on the lines 4—4 of Figs. 3 and 5.

Fig. 5 is a sectional detail on the lines 5—5 of Figs. 3 and 4.

Fig. 6 is a fragmentary front elevation, looking in the direction indicated by the arrows 6 in Figs. 1 and 3.

Fig. 7 is a vertical cross section on the lines 7—7 of Figs. 1 and 2.

Fig. 8 is a cross sectional detail on the lines 8—8 of Figs. 2 and 6.

Fig. 9 is a perspective of the reciprocating carriage.

Figure 2:
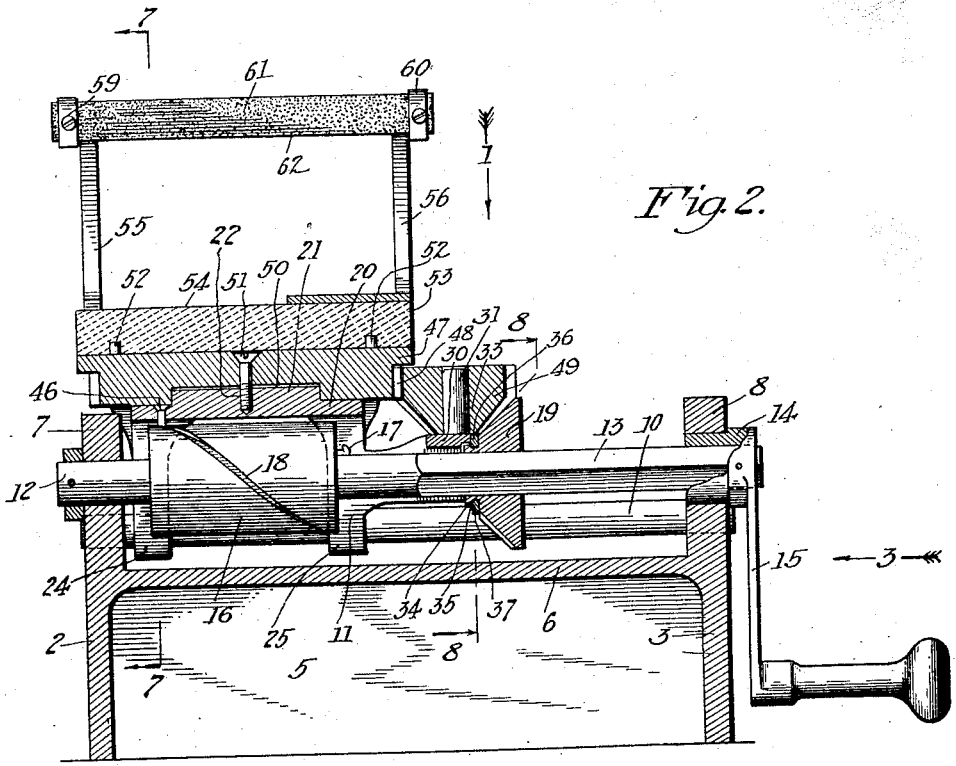
Fig. 2 is a vertical longitudinal sectional detail on the lines 2—2 of Figs. 1 and 3.
Figure 1:
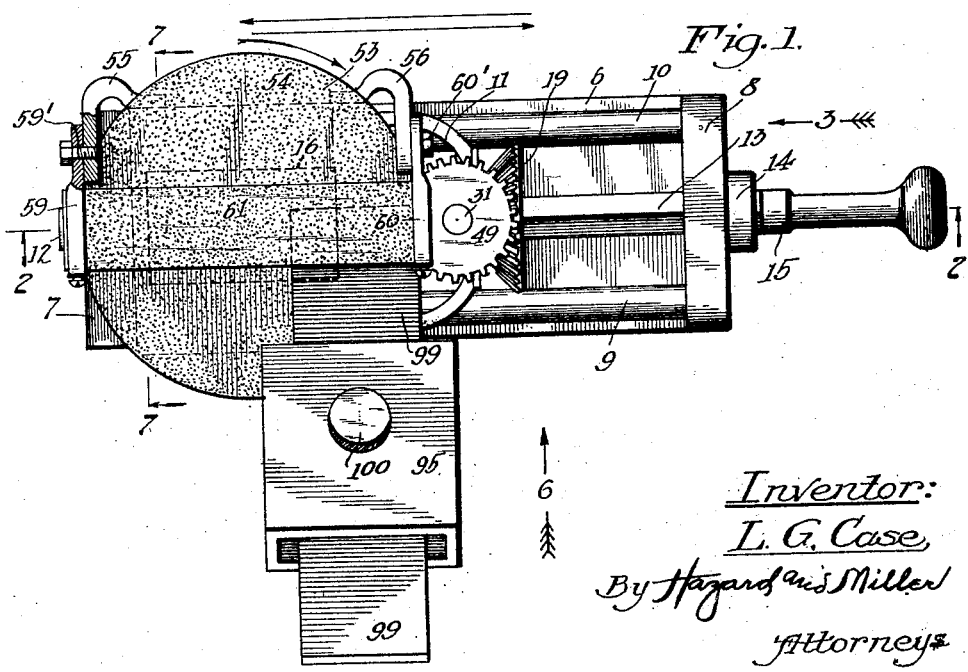
Figure 1 is a top plan view of a tool sharpening device embodying the principles of my invention, the view being taken looking in the direction of the arrows 1 in Figs. 2 and 3.

The details of the tool sharpening device are as follows:

The supporting frame is adapted to rest upon a table or bench 1 and is a casting having ends 2 and 3, sides 4 and 5, a top 6 formed integral with the ends and sides, and bearing blocks 7 and 8 extending upwardly from the ends of the top 6 in line with the ends 2 and 3.

Parallel rods 9 and 10 are mounted through the bearing blocks 7 and 8 a short distance above the top 6 to form a track upon which the carriage 11 reciprocates. A shaft 12 is rotatably mounted through the central portions of the bearing blocks 7 and 8, one half of the shaft having flat faces to make the squared portion 13 and the end having the flat faces 13 is mounted in a bushing 14 and the bushing rotates in the bearing block 8. A crank 15 is connected to the bushing 14.

A roller 16 is held rigid upon the round portion of the shaft 12 by a key 17 and has a reciprocating cam groove 18 in its periphery. A bevel gear 19 is slidingly mounted upon the squared end 13.

The details of the carriage 11 are as follows:

A rectangular plate 20 has a circular head 21 extending upwardly from its center and a tapped hole 22 at the center of the head. Posts 23, 24, 25 and 26 extend downwardly from the plate 20 and having bearing holes 27 through their lower ends to receive the track rods 9 and 10, so that the carriage may reciprocate between the bearing blocks 7 and 8.

Arms 28 and 29 extend outwardly from the posts 25 and 26 and are connected by a bearing block 30 having a stub shaft 31 extending upwardly from its center. The bearing block 30 is arched from its lower side to form a clearance 32 for the shaft 12. A bevel gear 33 is mounted upon the stub shaft 31 and meshes with the bevel gear 19 slidingly mounted upon the shaft 12.

A neck 34 extends from the small end of the gear 19 and has an annular groove 35 to receive connecting plates 36 and 37, said plates being connected to the bearing block 30 by screws 38, 39, 40 and 41 tapped into the holes 42, 43, 44 and 45 of the bearing block 30, so as to connect the bevel gear 19 to the carriage 11.

A cam pin 46 is fixed through the plate 20 in position to engage in the reciprocating cam groove 18 so that as the crank 15 is operated the carriage 11 will reciprocate and the bevel gear 19 will be held in mesh with the bevel gear 33 to drive the turntable 47 having a peripheral gear 48 engaged by a peripheral gear 49 formed integral with the gear 33.

The turntable 47 has a recess 50 in its lower face to fit the head 21 and a flat head screw 51 is inserted downwardly through the table 47 and tapped into the opening 22, so that as the carriage 11 reciprocates the turntable 47 will also rotate on an axis at right angles to the line of reciprocation. Pins 52 are rigidly fixed to the turntable 47 and project upwardly. An oil stone 53 is mounted upon the turntable 47 and has openings to receive the pins 52 to hold the oil stone in place. The oil stone 53 has a grinding face 54 which is at right angles to the axis of rotation as distinguished from a grinder mounted to use the edge for a grinding face.

Arms 55 and 56 have attaching plates 57 secured to the back side of the carriage 11 by cap screws 58, said arms extending upwardly behind the turntable and grinder and forwardly to points in line with the center of the grinder. U-shaped clamps 59 and 60 are adjustably connected to the upper ends of the arms 55 and 56 by clamping screws 59′ and 60′ and a long rectangular oil stone 61 is mounted in the clamps 59 and 60 with its free grinding face 62 downwardly.

Arms 63 and 64 extend forwardly from the side plate 4 and are connected by a cross head 65 and arm 66 extends from the cross head 65 downwardly in front of the table top 1 and an extension arm 67 extends backwardly from the lower end of the arm 66 under the table and carries a clamping screw 68 for holding the device upon the table 1.

Ribs 69 and 70 are formed vertically upon the front face of the side 4 and the tool supporting arm 71 has a base 72 fitting against the plate 4 and having grooves to receive the ribs 69 and 70. A cap screw 73 extends through a vertical slot 74 formed in the base 72 and is tapped into the side 4 so that by manipulating the cap screw 73 the base 72 may be adjusted up or down and held rigidly in place by tightening the screw.

The arm 71 extends forwardly and upwardly from the base 72 and bearing blocks 75 and 76 extend from the upper end of the arm 71. A plate 77 fits between the upper ends of the bearing blocks 75 and 76 and has downwardly extending ears 78 and 79 and pivot pins 80 and 81 extend through the ears 78 and 79 and through the bearing blocks 75 and 76 to pivotally mount the plate 77. Adjusting screws 82 and 83 are mounted through the ends of the plate 77. Leaf springs 84 and 85 are attached to the upper end of the arm 71 and at its rear side and extend upwardly and forwardly to engage the plate 77. Ears 86 and 87 extend upwardly from the plate 77 in line with ears 78 and 79. A plate 88 has ears 89 and 90 fitting outside of the ears 86 and 87 and pivot pins 91 and 92 connect the ears 89 and 90 to the ears 86 and 87. Sides 93 and 94 extend upwardly from the plate 88 in line with ears 89 and 90 and a top plate 95 connects the sides 93 and 94. A plate 96 fits loosely upon plate 88 between the sides 93 and 94 and has a ledge 97 extending upwardly from one side and a pivot screw 98 extending downwardly through its center and tapped into plate 88.

The tool 99 to be ground fits upon the plate 96 against the ledge 97 and is held in place by a set screw 100 tapped through the plate 95 and having a pressure pad 101 upon its lower end engaging the tool 99 to grip the tool against the plate 96.

A leaf spring 102 is secured at one end against the lower face of the plate 88 and has a pin 103 fixed near its forward free end and extending loosely through an opening 104 in the plate 88 and engaging in openings 105 in the plate 96. The forward end of the spring 102 extends beyond the plate 88 and serves as a handle, so that when the handle is operated to withdraw the pin 103 from opening 105 the plate 96 will swing on the pivot 98 to adjust the tool 99 to various positions as shown in dotted lines in Fig. 5 and so that when the spring 102 is released and the pin 103 enters hole 105 the plate 96 will be held rigid to hold the edge of the tool 99 against the grinding face 54.

The springs 84 and 85 serve to tilt the tool holder upon the pins 80 and 81 so that the tool 99 will bear yieldingly upon the grinding face 54 and when the tool 99 has been ground to form a proper bevel edge 106 the operator may press forwardly and downwardly upon the tool holder to swing the tool 99 upwardly against the grinder 61 so as to remove the bur from the edge 106.

When the tool holder has been properly adjusted to hold the tool 99 the crank 15 is steadily operated in one direction and the grinder 53 rotates upon its vertical axis and reciprocates horizontally at right angles to the axis of rotation and when it is desired to remove the bur from the back side of the edge of the tool the tool is tilted upwardly against the tension of the springs 84 and 85 until it engages the grinder 61 and the grinder 61 reciprocates across the back of the edge of the tool.

Thus I have produced a tool sharpening device having a grinder mounted to rotate and having a grinding face crosswise of its axis of rotation and mounted to reciprocate in a line crosswise of its axis of rotation and having a non-rotating grinder reciprocating with the rotating grinder for removing the bur from the back of the ground edge on a tool, and an adjustable tool holder adapted to hold the edge of a tool against the rotating reciprocating grinder and adapted to swing the tool against the reciprocating grinder.

Various changes may be made without departing from the spirit of my invention as claimed.

I claim:

1. A tool sharpening device comprising a grinder mounted to rotate and having a grinding face crosswise of its axis of rotation and mounted to reciprocate in a line crosswise of its axis of rotation and having a non-rotating grinder reciprocating with the rotating grinder for removing the bur from the back of the ground edge on a tool, and an adjustable tool holder adapted to hold the edge of a tool yieldingly against the rotating reciprocating grinder and adapted to swing the back of the ground edge against the reciprocating grinder.

2. A tool sharpening device comprising a frame, a carriage mounted to reciprocate in the frame, a turntable mounted horizontally upon the carriage, a grinder mounted upon the turntable, an adjustable tool holder mounted in position to hold a tool against the grinder, a crank shaft, a reciprocating cam upon the crank shaft, a pin carried by the carriage and operating in the cam slot, a peripheral gear upon the turntable, a peripheral gear upon the carriage, a bevel gear integral with the peripheral gear, a bevel gear slidingly mounted upon the shaft and meshing with the first bevel gear, and means for rotating the shaft.

3. In a tool sharpening device, a grinder mounted to rotate and reciprocate and having a grinding face parallel with the line of reciprocation, a second grinder spaced from the first grinder and reciprocating with the first grinder, a tool holder pivotally mounted to hold a tool again the rotating grinder and adapted to swing the tool against the reciprocating grinder.

4. In a tool sharpening device, a frame, guide rods mounted in the frame, a carriage mounted to slide upon the guide rods, a drive shaft mounted in the frame, a cam connection between the drive shaft and the carriage for reciprocating the carriage, a turntable mounted to rotate upon the carriage, a connection between the drive shaft and turntable for rotating the turntable, a grinder upon the turntable, and a tool holder pivotally mounted to hold the tool yieldingly against the grinder.

5. In a tool sharpening device, a grinder mounted to rotate and reciprocate and having a grinding face parallel with the line of reciprocation, a second grinder adjustably spaced from the first grinder and reciprocating with the first grinder, a tool holder pivotally mounted to hold a tool against the rotating grinder and adapted to swing the tool against the reciprocating grinder.

In testimony whereof I have signed my name to this specification.

LEON G. CASE.